United States Patent [19]
deGroot

[11] Patent Number: 4,750,439
[45] Date of Patent: Jun. 14, 1988

[54] PLANTING FINGER ASSEMBLY

[75] Inventor: Peter F. deGroot, Monterey, Calif.

[73] Assignee: Bud Antle, Inc., Salinas, Calif.

[21] Appl. No.: 900,932

[22] Filed: Aug. 27, 1986

[51] Int. Cl.⁴ ..................... A01C 11/02; B65G 65/02; B25B 5/08; F16H 25/18

[52] U.S. Cl. ....................................... 111/3; 414/416; 294/116; 74/107

[58] Field of Search ............... 111/3, 2; 414/416, 417, 414/661, 739, 744 A, 753; 901/36; 198/803.9; 294/116, 115, 110.2, 86.4, 99.1, 102.1; 74/99 A, 99 R, 58, 59, 107, 89.15

[56] References Cited

U.S. PATENT DOCUMENTS

| | | |
|---|---|---|
| 570,905 | 11/1896 | Cheeseman . |
| 577,539 | 2/1897 | Speidel . |
| 1,026,492 | 5/1912 | Bruhn . |
| 1,073,702 | 9/1913 | Owens . |
| 1,888,143 | 11/1932 | Poll . |
| 2,061,210 | 11/1936 | Powell ..................... 111/3 |
| 2,237,196 | 4/1941 | Pomieraniec ............... 111/3 |
| 2,514,522 | 7/1950 | Shelton . |
| 2,739,548 | 3/1956 | Poll ..................... 111/3 |
| 2,853,962 | 9/1958 | Cease et al. ............... 111/3 X |
| 2,887,075 | 5/1959 | Linkogel . |
| 2,899,918 | 8/1959 | McMillan . |
| 3,023,717 | 3/1962 | Cline . |
| 3,125,044 | 3/1964 | Kolk ..................... 111/2 |
| 3,128,833 | 4/1964 | Johnson et al. . |
| 3,306,239 | 2/1967 | Martin, Jr. . |
| 3,394,667 | 7/1968 | White . |
| 3,446,164 | 5/1969 | Huane et al. . |
| 3,456,607 | 7/1969 | West . |
| 3,465,602 | 9/1969 | Garaud ..................... 74/58 |
| 3,797,417 | 3/1974 | Hahn . |
| 3,799,078 | 3/1974 | Blackmore et al. . |
| 3,805,532 | 4/1974 | Kistner . |
| 3,906,875 | 9/1975 | Kesinger et al. . |
| 4,031,832 | 6/1977 | Edwards . |
| 4,091,751 | 5/1978 | Dri et al. . |
| 4,122,784 | 10/1978 | Joswig . |
| 4,130,072 | 12/1978 | Dedolph . |
| 4,156,395 | 5/1979 | Edwards et al. . |
| 4,215,513 | 8/1980 | Dedolph . |
| 4,294,179 | 10/1981 | Cayton et al. . |
| 4,355,588 | 10/1982 | Armstrong et al. . |
| 4,588,070 | 3/1986 | Smith ..................... 414/753 X |
| 4,598,942 | 7/1986 | Shum et al. ............... 294/86.4 X |

FOREIGN PATENT DOCUMENTS

| | | |
|---|---|---|
| 850951 | 9/1970 | Canada . |
| 239593 | 5/1910 | Fed. Rep. of Germany . |
| 468367 | 11/1928 | Fed. Rep. of Germany . |
| 829241 | 1/1952 | Fed. Rep. of Germany . |
| 2013629 | 10/1971 | Fed. Rep. of Germany . |
| 2638846 | 3/1977 | Fed. Rep. of Germany . |
| 2854923 | 7/1979 | Fed. Rep. of Germany . |
| 2854922 | 7/1979 | Fed. Rep. of Germany . |
| 1091998 | 4/1955 | France . |
| 1136675 | 5/1957 | France . |
| 112199 | 4/1975 | German Democratic Rep. . |
| 144046 | 2/1954 | Sweden ..................... 111/2 |
| 627358 | 8/1949 | United Kingdom . |
| 2007952 | 5/1979 | United Kingdom . |
| 210521 | 3/1968 | U.S.S.R. . |
| 496008 | 2/1976 | U.S.S.R. . |
| 700727 | 12/1979 | U.S.S.R. ..................... 74/99 A |

*Primary Examiner*—James R. Feyrer
*Assistant Examiner*—Danton D. DeMille
*Attorney, Agent, or Firm*—Townsend and Townsend

[57] ABSTRACT

A planting finger assembly having paired planting fingers is disclosed for use with a planter of the type wherein plants are removed from a nursery tray, preferably by the stem, and transported to a secondary growing location preferably in a field for harvest. Each planting finger assembly has a pair of planting finger shafts mounted in parallel. The finger shafts each terminate in radially extending wedged shaped gripping fingers for holding and releasing the plant. The two fingers on each plant finger assembly rotate on the finger shafts towards and away from one another responsive to oppositely disposed spiral cams and a joined pair of cam followers. Opposite rotation of the fingers moves the fingers from an opened position for receiving or discharging a plant to a closed position for gripping and transporting the plant. When paired finger assemblies are disposed in side-by-side relation and the respective planting fingers of each assembly are opened, the wedge shaped fingers of adjacent assemblies form separating wedges for the plants. Typically, the separating wedges separate the foliage of plants in adjacent cells and direct them into the receiving pockets formed by the open gripping fingers on each finger assembly. Thereafter, when the fingers are closed, adjacent fingers on each finger assembly grab only the immediately intended plant and do not entangle the foliage of adjacent plants.

8 Claims, 5 Drawing Sheets

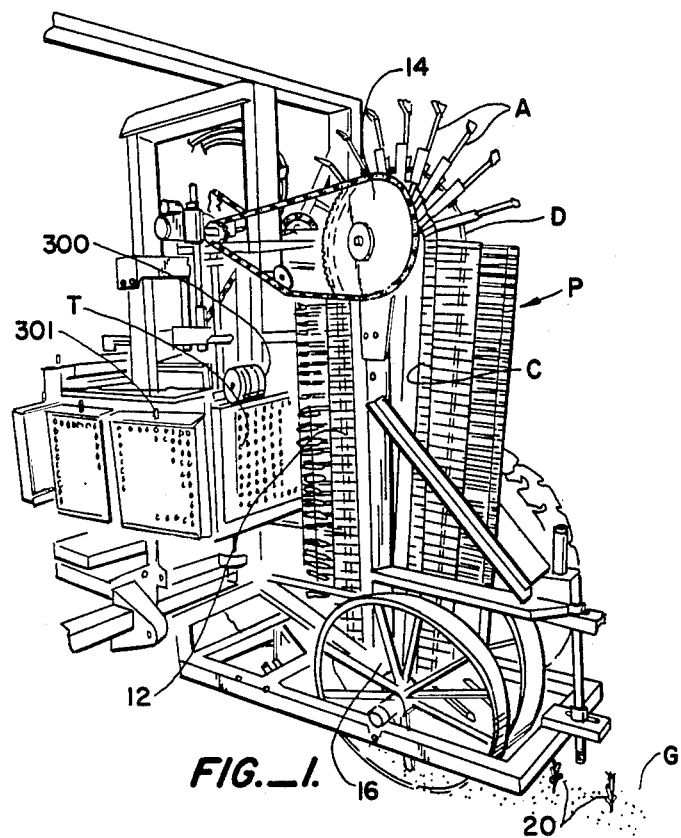
FIG._1.
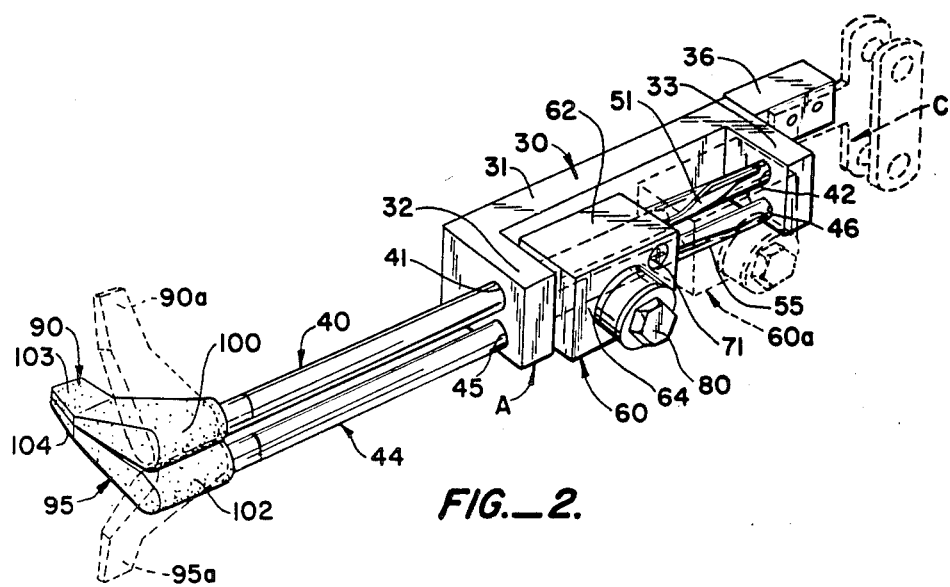
FIG._2.

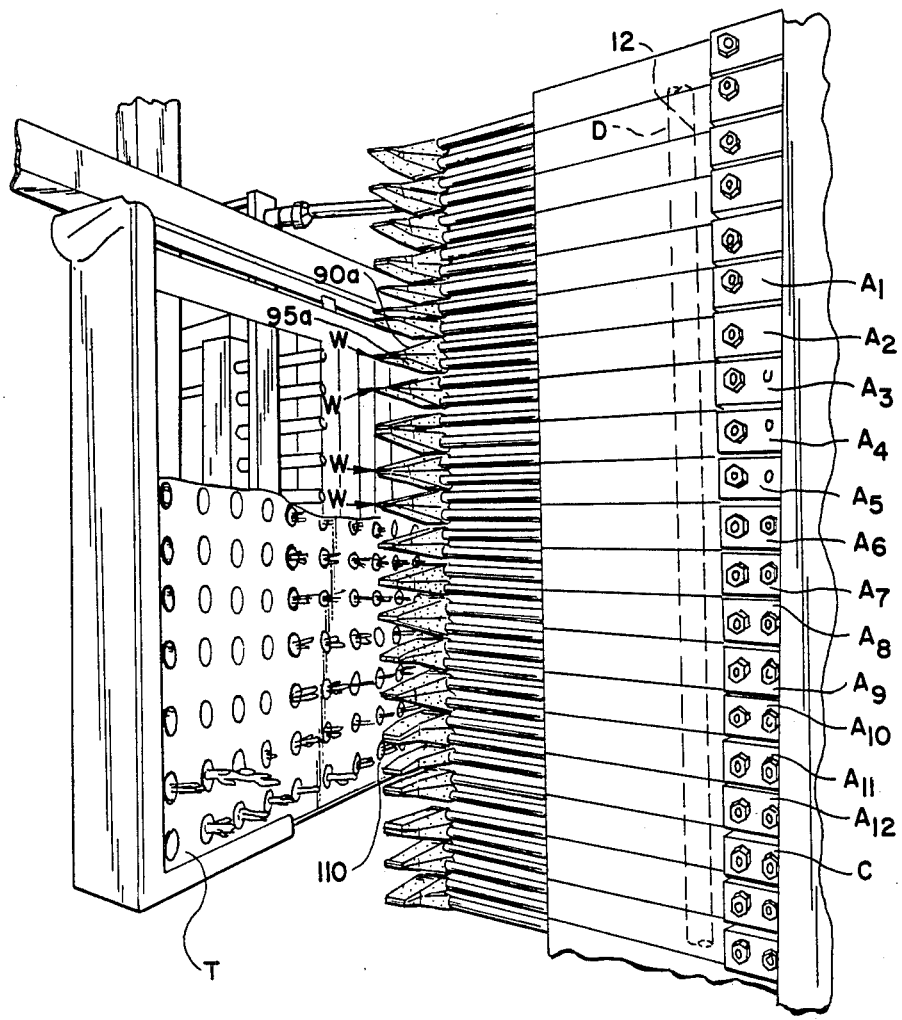
FIG._3A.

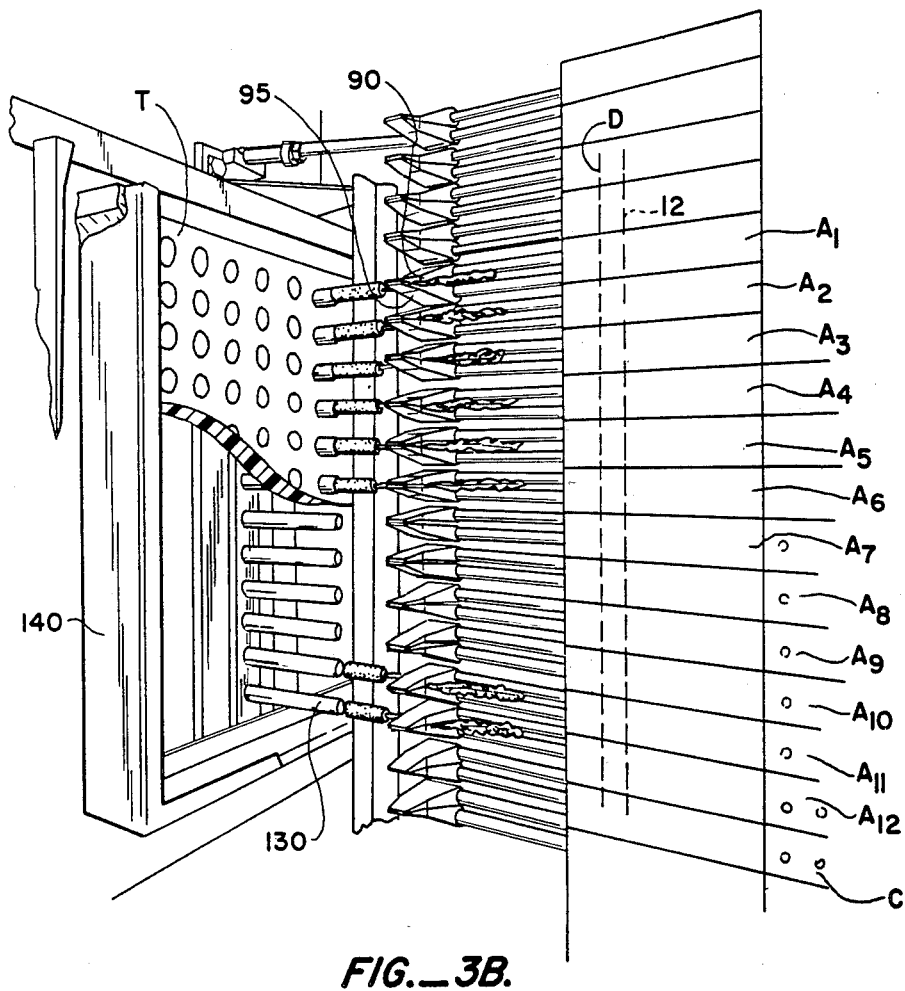
FIG._3B.

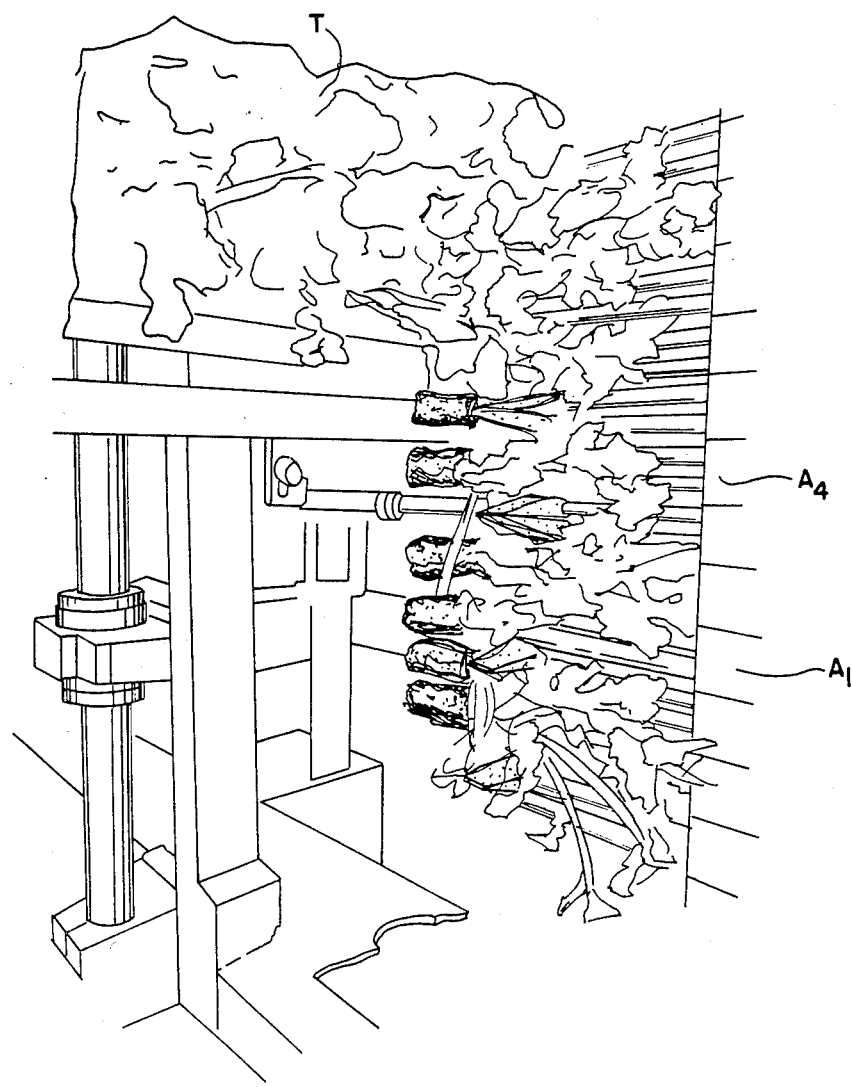
FIG._3C.

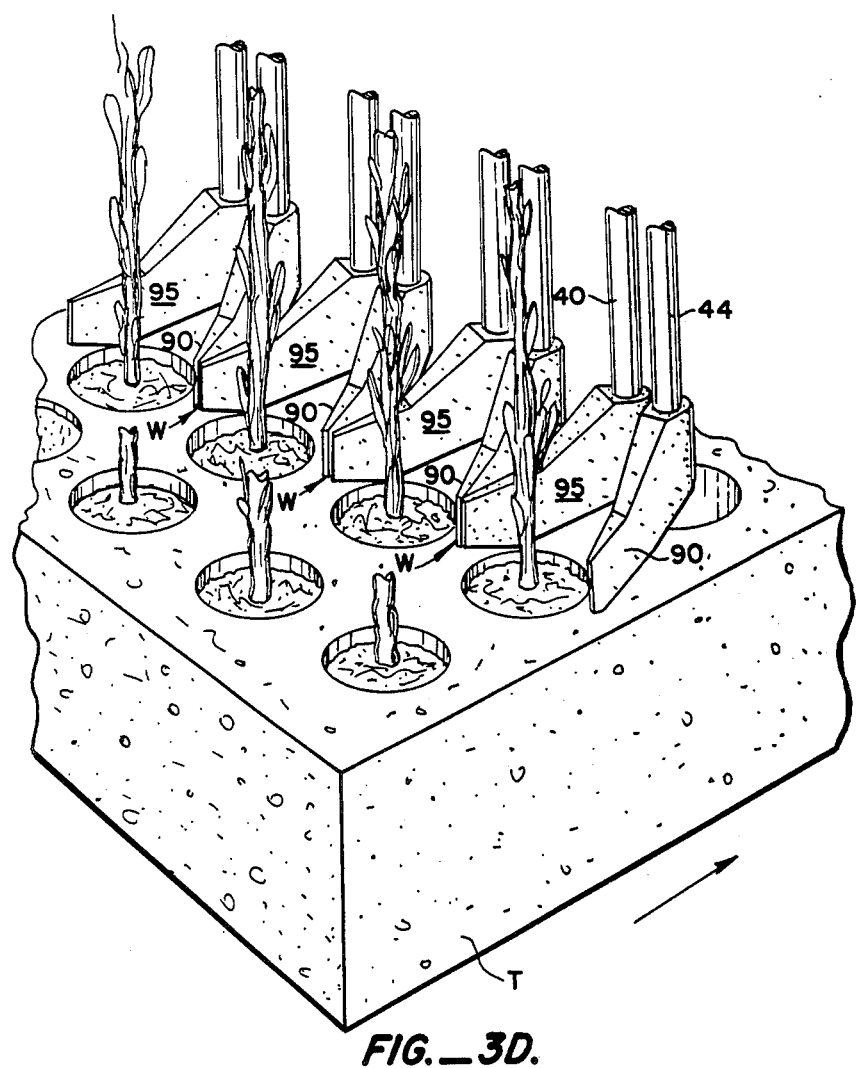
FIG._3D.

PLANTING FINGER ASSEMBLY

BACKGROUND OF THE INVENTION

The invention relates to planters and specifically to a new finger assembly for use with planters.

SUMMARY OF THE PRIOR ART

Planters having plant gripping assemblies with fingers are known and admitted to be old.

Two classical problems associated with plant gripping assemblies having fingers are constantly encountered.

First, the planting fingers must be capable of grasping the plants without damage.

Secondly, the planting fingers do not directly participate in the removal of the plants from the tray.

SUMMARY OF THE INVENTION

A planting finger assembly having paired planting fingers is disclosed for use with a planter of the type wherein plants are removed from a nursery tray, preferably by the stem, and transported to a secondary growing location preferably in a field for harvest. Each planting finger assembly has a pair of planting finger shafts mounted in parallel across a U-shaped carrier. The planting finger shafts rotate with respect to the U-shaped carrier along parallel axes extending through the ends of the U and spanning the interval therebetween. The paired fingers penetrate and extend beyond the U. The finger shafts each terminate in radially extending wedged shaped gripping fingers for holding and releasing the plant. The two fingers on each plant finger assembly rotate on the finger shafts towards and away from one another responsive to oppositely disposed spiral cams and a joined pair of cam followers. Opposite rotation of the fingers moves the fingers from an opened position for receiving or discharging a plant to a closed position for gripping and transporting the plant. When paired finger assemblies are disposed in side-by-side relation and the respective planting fingers of each assembly are opened, the wedge shaped fingers of adjacent assemblies form separating wedges for the plants. Typically, the separating wedges separate the foliage of plants in adjacent cells and direct them into the receiving pockets formed by the open gripping fingers on each finger assembly. Thereafter, when the fingers are closed, adjacent fingers on each finger assembly grab only the immediately intended plant and do not entangle the foliage of adjacent plants. Finger assembly movement is effected by an endless chain and endless cam track. Each finger assembly is attached to the endless chain with the cam followers disposed in the cam track. Variation of the spacing of the cam track from the path of the chain causes the fingers to open and close. Preferably the plants are gathered from the tray in close and parallel alignment to the planting finger assembly and are placed in spaced apart relation at the secondary growing location. The spaced apart relation occurs responsive to the passing of a chain around a radius of curvature so that the radial projection of the finger assembly and the length of the planting fingers effects the desired plant spacing.

OTHER OBJECTS AND ADVANTAGES

An object of this invention is to disclose a new planting finger assembly having parallel aligned rotating plant gripping fingers for receiving and releasing plants when the fingers are rotated to the opened position and firmly gripping plants when the fingers are rotated to the closed position. Each planting finger assembly includes a U-shaped member with parallel finger shafts spanning the opening of the U and mounted for rotation at the respective ends of the U. Each of the parallel fingers includes spiral cams and a joined pair of cam followers. Preferably the spiral cams and joined pair of cam followers are located in the span of the U. When the joined cam followers are moved with respect to the spiral cams on each of the fingers, the oppositely disposed cams cause opposite rotation. Consequently opening and closing of the fingers occurs with a high degree of precision.

An advantage of this aspect of the invention is that the pitch of the oppositely disposed spiral cams on the fingers can be changed. For example, initial movement of the cam follower with respect to the fingers can cause rapid finger opening with final movement of the cam follower causing the fingers to be maintained substantially closed.

Yet another object of this invention is to disclose the finger assemblies in combination with a chain path and cam follower path. According to this aspect of the invention, the fingers are fastened in closely spaced parallel relation to a chain. The chain is disposed along a chain path. Adjacent the chain path there is a cam follower path. By the expedient of varying the spacing of the cam follower path from the chain path, adjustably precise opening and closing of the fingers occurs.

An advantage of this aspect of the invention is that intimate adjustment of the finger position can occur responsive to the spacing of the chain path relative to the cam follower path. For example, a group of fingers may be simultaneously opened and simultaneously closed by the expedient of moving the cam follower path towards and away from the chain path.

Yet another object of this invention is to disclose a cooperation between the wedged shaped planting fingers of adjacent finger assemblies. Specifically, when the adjacent fingers assemblies are placed in side-by-side and parallel relation and the fingers are moved to the opened position, adjacent radially extending fingers of adjacent finger assemblies form plant separating wedges. These plant separating wedges can be moved into and towards a row of plants to be grasped. The formed plant separating wedges separate the plants at the base of their exposed foliage. Once the separation of the foliage has occurred. the fingers are closed. The fingers enclose and capture the plant.

An advantage of this aspect of the invention is that interference between adjacent plants is avoided. Consequently, when the fingers are moved from an immediately adjacent side-by-side spacing to a far apart side-by-side spacing, damage to the plants or dropping of the plants does not occur.

BRIEF DESCRIPTION OF THE DRAWINGS

Other objects, features, and advantages of this invention will become more apparent after referring to the following specification and attached drawings in which:

FIG. 1 is a perspective view of the planter on which the improved fingers of this invention may be utilized;

FIG. 2 is a perspective view of the improved planting finger assembly of this invention;

FIG. 3A is a view of the planting fingers gathering plants from a tray;

FIG. 3B is a view of the planting fingers removing plants from a tray; and,

FIG. 3C illustrates the planting fingers conveying plants from a tray.

FIG. 3D illustrates a perspective of the planting fingers at the plants effecting foliage separation.

DESCRIPTION OF THE PREFERRED EMBODIMENTS

Referring to FIG. 1, a planter mechanism P is shown. The mechanism includes an endless chain C and a cam traveller path D. Chain C is disposed in an endless belt configuration between an upper pulley 14, and a lower pulley 16.

The chain has attached thereto a plurality of planter finger assembles A. Assemblies A gather plants from trays T disposed on a tray conveyer. The plants are then transported and placed within the ground G in a path 20 behind the planter P.

The reader will understand that the planting fingers can be used for any purpose where the handling of plants is required. For example, transplanting into pots as well as transplanting into fields can occur using the finger herein described.

Referring to FIG. 2, a perspective view of a finger assembly A is illustrated. Assembly A includes a U-shaped element 30 including a bottom U member 31 and two end U members 32, 33. Paired planting finger shafts 40, 44 are utilized. Fingers 40, 44 transpierce on parallel bores the respective ends of the U-shaped clamp 30. Finger shaft 40 transpierces U end 32 at bore 41 and turns on U end 33 on bearing 42. Similarly, finger 44 transpierces U end 32 on bore 45 and pivots U end 33 at bearing 46.

Both fingers have a spiral cam. The spiral cams are oppositely disposed. Spiral cam 51 on finger shaft 40 is opposite to spiral cam 55 on finger shaft 44. A cam follower assembly 60 rides over each of the fingers 40, 44. Riding occurs along the respective cams 51, 55. Cam follower 60 includes respective bores 62, 64 for receiving the finger shafts and the disposed cams.

Conventional and joined cam followers for following the spiral cams 51, 55 are used. Such a conventional cam follower 71 for following cam 51 on finger 40 is shown. The remaining cam follower for shaft 44 is hidden from view.

A cam path follower 80 is attached to assembly 60. This cam assembly follower allows assembly 60 to move from a position where the respective plant grasping fingers 90, 95 are closed to a position where the cam fingers 90a, 95a (shown in broken lines) are opened.

Operation of the device can be easily understood. Specifically, when the cam follower assembly 60 is in the position shown in solid lines, fingers 90, 95 are closed in the position shown in solid lines. When the cam follower 60a is in the position shown in broken lines, the respective fingers are in the position shown at 90a and 95a (also in broken lines).

U-shaped assembly 30 is attached at a lug 36 to chain C. Thus the finger assembly A is held at substantial right angles to the finger.

Fingers 90, 95 are typically made of rubber. As can be seen, they are each wedged shaped. The wedges have their thick portions 100, 102 attached to the shafts. The thin and plant gripping portions 103, 104 extend away from the respective finger shafts. Both stiffness and elasticity of the fingers are chosen to suit the crop. For example, reinforcement of the illustrated fingers with wire could occur.

Referring to FIG. 3A a view of a tray T with respect to a plurality of finger assemblies A1 through A8 is illustrated. Fingers A1 through A4 are shown overlying a mechanism for ejecting plugs from trays. The tray T has been broken away so that the apparatus can be understood without the presence of plants.

Finger assemblies A5 through A8 are shown overlying the tray itself. The function of the fingers in separating the plants can be seen and understood.

In FIG. 3A. cam follower path D is shown in broken lines. It will be understood that cam follower path D is movable towards and away from chain C at moveable track path 12. The mechanism for such movement is cam actuated. A suitable movement is described in my co-pending application entitled "Tray Planter," filed concurrently herewith.

In FIG. 3A, cam follower path D is disposed immediately adjacent the chain C. Consequently, the follower assemblies 60 are moved to the position 60a illustrated in FIG. 2. Fingers 90, 95 move to the opened position.

As can be seen in FIGS. 3A and 3D, the wedge shaped fingers 90a and 95a of adjacent finger assemblies form a separating wedge W. Separating wedge W functions to divide and separate plants on either side of the pair of wedges between the opened fingers 90, 95 of the respective finger assemblies.

Once the plant separating wedges W have been formed, tray T is advanced. An exposed row of plants 110 is separated. In such movement, the plants and associated foliage will be forced into receiving pockets between the opened fingers of the finger assemblies. Plants will not be caught between or entangled with either adjacent finger assemblies A1–A8.

Referring to FIG. 3B, it will be seen that cam path D has been moved away from chain C. Consequently, assembly 60 moves to the position shown in solid lines in FIG. 2 and respective fingers 90, 95 close about the stems of the plants.

It will be remembered that the respective fingers 90, 95 are made of rubber. The rubber is typically selected to have optimum resiliency for grasping without crushing the stems of plants which may vary significantly in girth.

The plants here grasped are ejected from trays by rod ejectors 130. The trays are in turn held between rails 140 (only one such rail being shown). Movement of the rod ejectors 130 and the tray rails 140 is cam actuated and likewise discussed in my co-pending patent application entitled Tray Planter. Such movement assists ejection of the grasped plants.

Referring to FIG. 3C, transport of the plants can be easily understood. Finger assemblies A1–A4 are shown with plants stems grasped between the respective fingers 90, 95. The fingers are moving to and towards the ground. At the ground, the fingers are opened, provided with the desired spacing and deposited and packed as is conventional with known planters.

The reader will understand that I have illustrated the transplanting of root bound nursery grown plants. In such transplanting, the plants are grasped at their stems and the binding of the roots is relied upon to entrain sufficient soil from the tray T to the ground G to enable a successful transplant.

It is known to grow nursery plants in elastomeric plugs. Those skilled in the art will understand that the disclosed fingers, or adaptations of the disclosed fingers, can be utilized to grasp the soil mass of the transplanted plant. While this is not preferred, the disclosed finger assembly can be adapted to this end.

What is claimed is:

1. A finger assembly for use in a planter of the type having a tray containing nursery grown plants, said plants being conveyed between said tray and a growing location for deposit of plants, said finger assembly comprising:

first and second planting finger shafts;

each planting finger shaft having fingers radially protruding from the shaft at one end whereby adjacent fingers shafts have adjacent fingers;

a spiral cam configured in each said finger shaft with the spiral cam on one shaft oppositely disposed to the spiral cam on an adjacent shaft;

a finger assembly body defining parallel supports for each said finger shaft to permit parallel rotation of said finger shafts relative to and in opposite directions to one another;

at least one cam follower assembly configured for relative movement over said oppositely disposed spiral cams on said finger shafts whereby said fingers open and close in response to movement of said cam follower assembly over said spiral cams.

2. A finger assembly according to claim 1 and wherein at least one finger on one of said planting finger shafts is resilient.

3. The finger assembly of claim 1 and wherein said finger assembly body is U-shaped and each planting finger shaft spans said U-shaped finger assembly body.

4. The finger assembly of claim 1 and wherein said spiral cams have variable pitch for effecting variable rotation at changing rates along the length of said fingers.

5. Finger assemblies for use in a planter of the type having a tray containing rows and columns of nursery grown plants, said nursery grown plants being conveyed from a row in said tray where said plants are received to a growing location where said plants are deposited, said finger assemblies comprising:

a conveyor for conveying a plurality of said finger assemblies in side-by-side relation, said finger assemblies grasping simultaneously a plurality of plants from a row in said tray;

each finger assembly including first and second planting finger shafts;

each planting finger shaft having resilient fingers radially protruding from the shaft at one end whereby adjacent shafts have adjacent fingers;

each finger on each shaft having a wedge configuration with the thick portion of said wedge attached to said shaft and the thin portion of said wedge extending radially away from said shaft for grasping said plants;

a finger assembly body for defining parallel supports for each said finger shaft to permit parallel rotation of said finger shafts relative to and in opposite directions from one another;

means for counter-rotating said finger shafts cooperatively attached to said finger shafts to permit said fingers to move towards and away from one another for respective movement between an open position of said wedge shaped resilient fingers and a closed position of said wedge shaped resilient fingers;

each wedge shaped resilient finger of adjacent finger assemblies being disposable by said counter-rotating means to contact a finger of an adjacent finger assembly in said open position forming plant separating wedges imposable between the plants in the row of the tray whereby foliage of plants from a row in said tray to be received by said fingers assemblies is separated by said separating wedges and captured within one of said finger assemblies only when said fingers of each assembly move to said closed position.

6. The finger assemblies of claim 5 and wherein said conveyor comprises an endless conveyor.

7. The finger assemblies of claim 5 and wherein said means for counter-rotating said finger shafts includes oppositely disposed spiral cams on said finger shafts and at least one cam follower for following said spiral cams to counter-rotate said finger shafts.

8. The finger assembly of claim 7 and wherein said conveyor includes an adjacent cam track having variable spacing from the path of said conveyor to move said cam follower for adjustable opening and closing of said fingers.

* * * * *